United States Patent Office 2,812,658
Patented Nov. 12, 1957

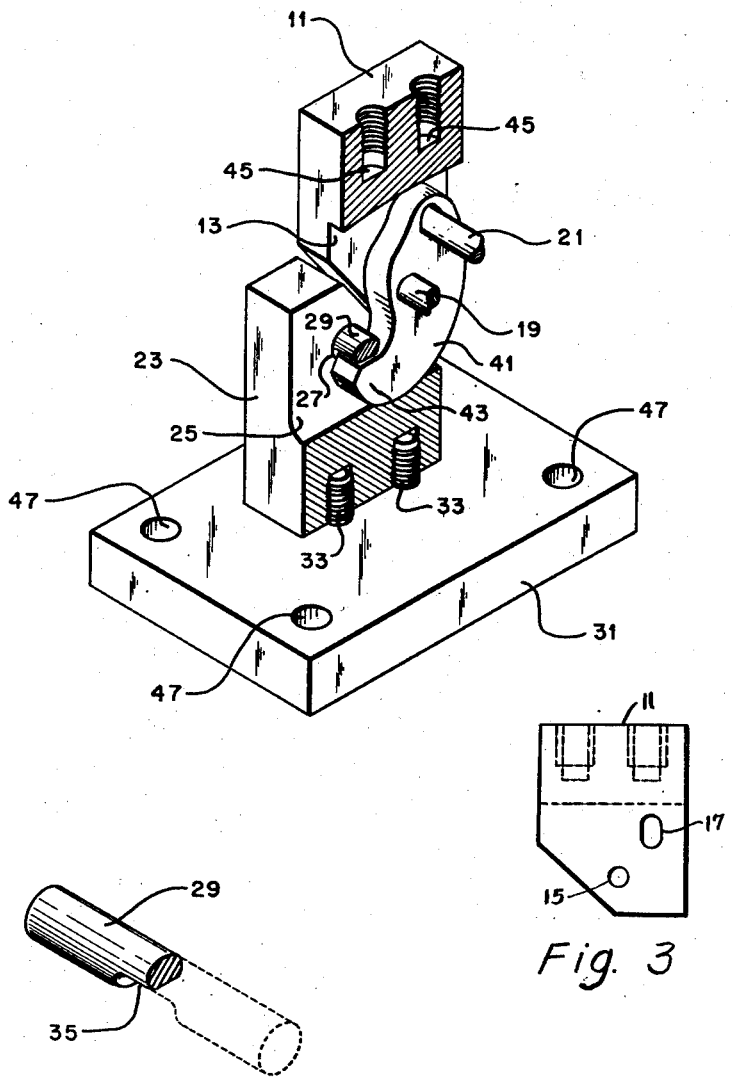

2,812,658
FATIGUE TEST ASSEMBLY

Carl A. Damm, Upper Black Eddy, William Paraskewik, Lansdale, and Jerome W. Kaufman, Willow Grove, Pa., assignors to the United States of America as represented by the Secretary of the Navy Application November 29, 1954, Serial No. 471,931

2 Claims. (Cl. 73—103)

(Granted under Title 35, U. S. Code (1952), sec. 266)

The invention described herein may be manufactured and used by or for the Government of the United States of America for governmental purposes without the payment of any royalties thereon or therefor.

The present invention relates to a fatigue test assembly for hook members and more particularly to a fatigue test assembly for hook members which accurately simulates the loading imposed upon hook members under actual operating conditions.

The known means for fatigue testing hook members included a slotted upper fixture arranged to support the upper end of a hook member and a lower fixture with an eye section formed therein to receive the hooked portion at the lower end of the hook member, both adapted to be installed in a conventional fatigue testing machine. This arrangement had several disadvantages. First, the lower fixture was machined from a solid piece of metal and the machining operation include the difficult and time consuming operations necessary to accurately shape the eye section for engagement with the hooked portion of a hook member. Consequently, manufacture of the lower fixture was inevitably a costly and time consuming procedure. Second, since the eye section of the lower fixture was formed as an integral part of that fixture and in fixed relation to the remainder of the fixture, the surface contour of the eye section of the fixture could not adjust to follow the contour of the hooked portion of the hook member as the hook member was distorted under an imposed load. Therefore, the contour of the eye section Brinelled the surface of the hooked portion and thus provided an invalid test of the hook member. Third, due to the uneven application of loads, the eye section of the integrally formed lower fixture was ruined after relatively few tests and the entire lower fixture had then to be discarded and replaced with a new fixture.

The present invention contemplates an improved fatigue test assembly for hook members in which the lower fixture includes a slotted block similar to the upper fixture and a removable pin rotatably mounted in the block which may be provided with a surface which will mate with that of the particular hook member to be tested.

An object of the present invention is to provide a simplified fatigue test assembly for hook members which is easier to fabricate and hence cheaper.

Another object is the provision of a fatigue test assembly for hook members including a rotatably mounted removable element for engagement with the hooked portion of a hook member.

A further object of the present invention is the provision of a means for obtaining more valid test results in fatigue tests of hook members.

A final object of the present invention is to provide means for more accurately simulating actual service conditions during the fatigue tests of hook members.

The exact nature of this invention as well as other objects and advantages thereof will be readily apparent from consideration of the following description relating to the annexed drawings in which:

Fig. 1 shows an isometric view of a preferred embodiment of the present invention, Fig. 2 shows a broken away isometric view of the rotatably mounted removable element, and Fig. 3 illustrates a side elevation of the upper fixture of the preferred embodiment of the instant invention.

Referring now to the drawings, wherein like reference characters designate like or corresponding parts throughout the several views, Fig. 1 illustrates a preferred embodiment including an upper fixture 11, having a vertical slot 13 in its lower end and provided with a pair of transversely extending openings 15 and 17, illustrated in Fig. 3, intersecting and extending perpendicular to the slot 13 to receive a cylindrical hook member supporting pin 19 and a hook member restraining pin 21. It will be noted that the opening 15 is cylindrical while the opening 17 may be provided with an elongated cross section to allow dimensional tolerance for variations in the spacing of the holes through the hook member to be tested. The showing in Fig. 1 also includes a lower fixture 23 having a vertical slot 25 through its upper end and provided with a transverse cylindrical opening 27 intersecting and extending perpendicular to said slot 25 to receive a generally cylindrical pin 29 rotatably mounted therein. As shown in Fig. 1, the lower fixture 23 may conveniently be fixedly secured to a supporting base plate 31 by suitable attachment means such as the bolts 33.

Referring next to Fig. 2, this view provides a detailed showing of the contoured portion of the pin 29 provided intermediate its ends to form a mating surface for engagement with the hooked portion of a hook member to be tested.

The operation of the present invention will be described in relation to the showing in Fig. 1 which shows the fixtures 11 and 23 in the operative relationship they assume when installed in a conventional fatigue testing machine and also includes a showing of a representative hook member 41 including a hooked portion 43 at its lower end. In operation, the upper fixture 11 may be secured to the upper plate of the conventional fatigue testing machine by means of a suitable attachment means such as bolts engaged in the threaded holes 45 in the upper fixture, and the lower fixture may be secured to the lower plate of the fatigue testing machine by suitable attachment means such as bolts inserted through the holes 47 in the supporting base plate 31. With these fixtures installed in this manner the fatigue testing machine subjects the hook member 41 to fatigue loads since it is connected to the upper fixture by means of pins 19 and 17 and to the lower fixture by means of the rotatable pin 29.

Since the cantilevered portion 43 of hook member 41 is deflected under imposed load it tends to move out of alignment with the mating surface in the eye section of a conventional lower fixture formed entirely out of a solid block material. In contrast, the rotatably mounted pin 29 shown best in Fig. 2 which characterizes the present invention, rotates within the lower fixture 23 as the hooked portion of a hook member is deflected to insure proper alignment of the mating surfaces under all load conditions. Moreover, since hook members of the type to be tested with the present invention are most frequently used to support a load which is engaged with the hook only once, such as a bomb, more accurate simulation of actual service conditions is achieved by the provision of a mating surface used only once for engagement with the hooked portion of a hook member. With a conventional lower fixture this would have been prohibitively expensive and time consuming because a new lower fixture would have been required for testing each hook. However, with the present invention, the pin 29 in the lower fixture 23 may conveniently be replaced after each test, because such pins are relatively simple and inexpensive to fabricate, particularly in large quantities.

While the improved fixtures comprising the present invention are disclosed for use in fatigue testing, they are also readily adaptable for use in pre-stressing hook members as an essential step in the production of such parts.

Obviously, many modifications and variations of the present invention are possible in the light of the above teachings. It is, therefore, to be understood that within the scope of the appended claims the invention may be practiced other than as specifically described.

What is claimed is:

1. A a fatigue test assembly for hook members comprising an upper fixture and a cooperating lower fixture; said upper fixture having a first centrally disposed vertical slot in its lower end and first and second transverse openings therethrough intersecting said slot, a hook member supporting pin for insertion in said first transverse opening, and a hook member restraining pin for insertion in said second transverse opening, and said lower fixture having a second centrally disposed vertical slot in its upper end and a transverse circular opening therethrough intersecting said slot, and a generally cylindrical pin arranged to be rotatably mounted in said circular opening; said generally cylindrical pin having a modified non-cylindrical surface contour intermediate its ends shaped so that it corresponds exactly to and mates with the abutting surface contour of the hooked portion of a hook member to be tested thereby over a substantial load-bearing area of mutual contact.

2. For use with a universal fatigue testing machine having upper and lower mounting plate, a fatigue test assembly for hook members comprising an upper fixture arranged to be mounted beneath the upper plate of a fatigue testing machine and a cooperating lower plate to be mounted upon the lower plate of a fatigue testing machine; said upper fixture comprising a first unitary member including a pair of downwardly depending spaced parallel projecting portions, each provided with first and second spaced transverse openings therethrough aligned with the corresponding openings in the other downwardly depending portion, an elongated hook member supporting pin extending through said first transverse openings, and an elongated hook member restraining pin extending through said second transverse openings, whereby said upper fixture provides fixed support between said downwardly depending portions for a hook member with two transverse openings therethrough; and said lower fixture comprising a second unitary member including a pair of upwardly extending spaced parallel projecting portions each provided with a cylindrical transverse opening therethrough aligned with the opening in the other upwardly extending portion, and a rotatable elongated hook engaging pin extending through said cylindrical transverse openings having cylindrical end sections and a contoured intermediate section, said hook engaging pin cooperating with said second unitary member to form an eye shaped for mating engagement over a substantial load-bearing area of mutual contact with the hooked portion of a hook member fixedly supported in the upper fixture, whereby operation of a fatigue testing machine equipped with said fatigue test assembly accurately simulates service conditions to produce valid fatigue test results.

References Cited in the file of this patent

FOREIGN PATENTS 355,371     Germany _____ June 26, 1922